(12) United States Patent
Bauer et al.

(10) Patent No.: US 11,516,025 B2
(45) Date of Patent: Nov. 29, 2022

(54) ADVANCE MOBILE DEVICE AND VEHICLE PROFILE PAIRING

(71) Applicant: Ford Global Technologies, LLC, Dearborn, MI (US)

(72) Inventors: Justin Bauer, Plymouth, MI (US); Thomas Miller, Ann Arbor, MI (US); Simon Lidwell, Sterling Heights, MI (US); Pietro Buttolo, Dearborn Heights, MI (US); James Stewart Rankin, II, Novi, MI (US); Stephen Coe, Ariss (CA); Colin Ho, Kanata (CA); Robbie Maurice, Waterloo (CA)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 16/824,017

(22) Filed: Mar. 19, 2020

(65) Prior Publication Data
US 2021/0297270 A1    Sep. 23, 2021

(51) Int. Cl.
*H04L 9/32* (2006.01)
*G07C 5/00* (2006.01)
(Continued)

(52) U.S. Cl.
CPC ............ *H04L 9/3273* (2013.01); *G07C 5/008* (2013.01); *H04W 4/44* (2018.02); *H04W 4/80* (2018.02)

(58) Field of Classification Search
CPC ..... G07C 5/008; H04L 9/3271; H04L 9/3273; H04L 63/062; H04W 4/40; H04W 4/44;
(Continued)

(56) References Cited

U.S. PATENT DOCUMENTS 10,491,734 B1 * 11/2019 Annasagaram Krishnamurthy .... G06F 21/44
2015/0024688 A1 * 1/2015 Hrabak ................... H04W 4/80
455/41.2
(Continued)

FOREIGN PATENT DOCUMENTS

CN          105416209 B     11/2017
EP           2713582 A1      4/2014

OTHER PUBLICATIONS

"Damon Lavrinc, The Car Seat of Tomorrow is Self-Adjusting and Bluetooth-Connected" Web page <https://www.wired.com/2012/12/faurecia-smartfit>, 2 pages, retrieved from the internet on Dec. 28, 2020.

*Primary Examiner* — Pao Sinkantarakorn
(74) *Attorney, Agent, or Firm* — Frank Lollo; Eversheds Sutherland (US) LLP

(57) ABSTRACT

An advance pairing system preemptively pairs a phone to a vehicle using a backend cloud system prior to establishing the connection with the vehicle, such as during the time that a user is purchasing a vehicle, or just after the user enters the vehicle for the first time. The system includes a mobile application for automated advance pairing with the vehicle's automotive computer. The mobile app sends a request for advance pairing to a server that assigns a set of unique keys to the account for secure pairing of the mobile device and the vehicle. The server pushes an encrypted payload to both the mobile device app and the vehicle advance pairing app operating on the automotive computer. The encrypted payload can include a unique vehicle ID, a unique mobile device ID, and one or more encryption keys. The mobile device and the vehicle use the encrypted advance pairing information to establish a secured connection with minimal user input.

20 Claims, 6 Drawing Sheets

(51) Int. Cl.
  *H04W 4/44* (2018.01)
  *H04W 4/80* (2018.01)
(58) Field of Classification Search
  CPC ....... H04W 4/48; H04W 12/03; H04W 12/50;
  H04W 76/11; H04W 76/14
  See application file for complete search history.

(56) References Cited

U.S. PATENT DOCUMENTS

2015/0203062 A1   7/2015  Neeraj
2018/0026949 A1*  1/2018  Kimn ................... H04L 9/0827
                                                              713/156
2019/0306703 A1* 10/2019  Golsch ................ H04W 12/50
2020/0037379 A1*  1/2020  Zellen .................... H04W 4/80
2020/0228337 A1*  7/2020  Sumien ................ H04L 9/3268

\* cited by examiner

ADVANCE MOBILE DEVICE AND VEHICLE PROFILE PAIRING

TECHNICAL FIELD

The present disclosure relates to mobile device network configuration, and more particularly, to pairing a mobile device with a vehicle before first use of the vehicle.

BACKGROUND

Pairing a phone to a vehicle can be a cumbersome process. In fact, 25% of customers today do not pair their phone to their vehicle. Currently, for a customer to connect their phone to their vehicle, they will have to navigate to the "phone" menu in the vehicle. This menu option is only available to the customer when the vehicle is stationary (speed<5 km/h). Upon selecting the "phone" menu, the customer is instructed to choose between several different options, with one option being "add a phone." When selecting the "add a phone" option, the customer concurrently navigates to the appropriate mobile phone setting and actively searches for Bluetooth® devices. After a short period, the two devices will connect via Bluetooth® and a Personal Identification Number (PIN) number will display on both screens (vehicle and phone). It is at this point that the customer will have to manually confirm the connection on both devices to complete the pairing and connecting process. Once the customer's phone is connected, they will receive a prompt on the phone to authorize access to their "contacts" and have them downloaded to the vehicle. The customer must also set the phone on which the contacts have just been downloaded as the "favorite" on the vehicle so that the vehicle will look for this phone first when in proximity of the vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
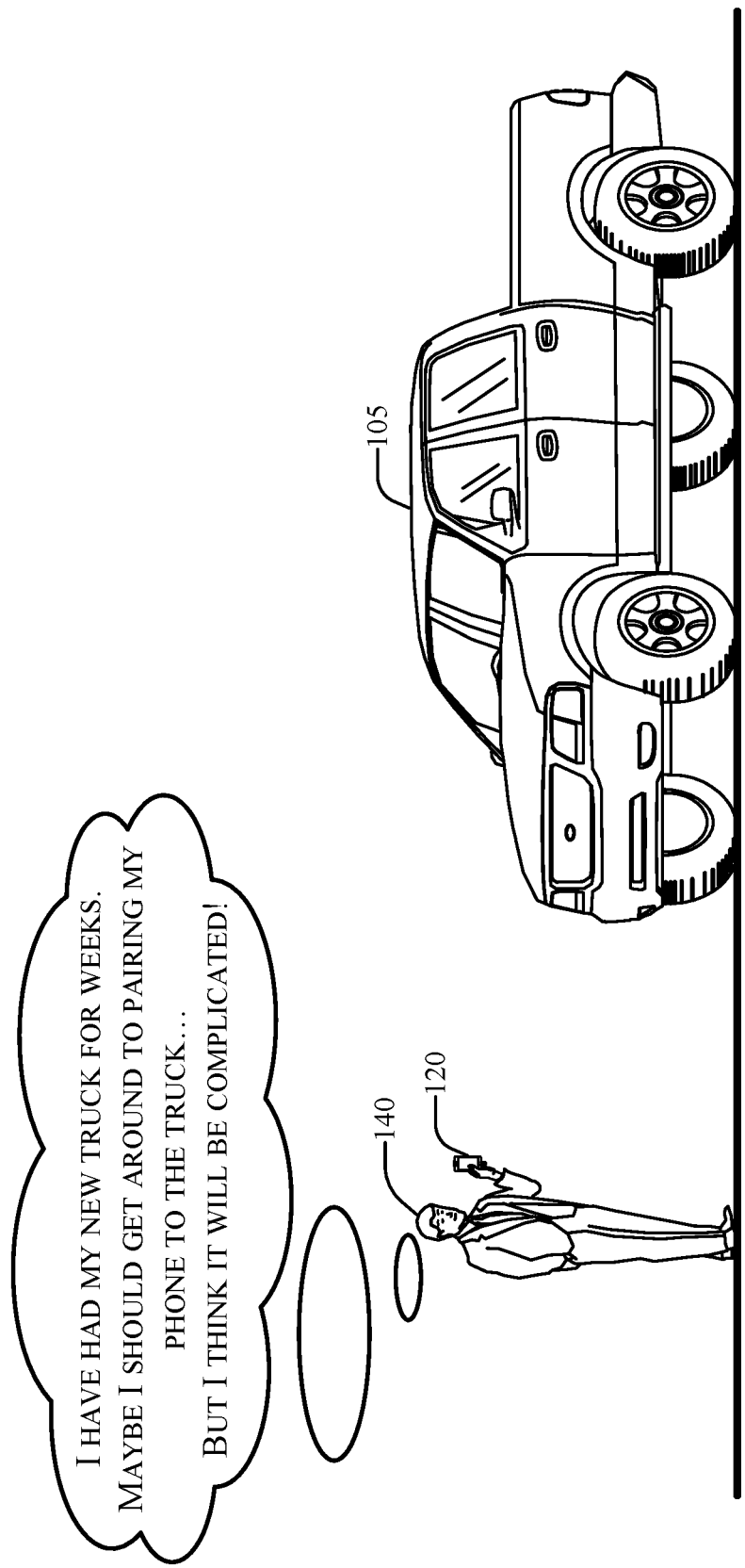
FIG. 1 is a depiction of a vehicle user with a new vehicle that remains unpaired with a personal mobile device.

The present disclosure describes an advance pairing and communication system (hereafter "advance pairing system") configured to pair a phone to a vehicle using a backend cloud system. The advance pairing system includes a mobile application for automated pre-pairing and connecting functionality with the vehicle's automotive computer. This may be performed at any time before the user initially enters and operates the vehicle, such as during the time that a user is purchasing or taking delivery of a vehicle.

The advance pairing system sends a request for advance pre-pairing to a Telematics Service Delivery Network (SDN) server. The request can include a vehicle identification number (VIN), and other personal identification information associated with the user such as name, address, date of vehicle purchase, vehicle fleet subscription information, etc. The SDN server may assign the VIN to a user account associated with the user stored on the SDN server. The SDN server may further associate a user profile that includes vehicle preferences, settings, and other similar information as part of the user account, and assign a set of unique electronic keys to the account for secure pairing of the mobile device and the vehicle. The unique keys include an encryption key pair, where one key of the pair is assigned to the vehicle and the other key of the pair is assigned to the mobile device.

Responsive to the request, the SDN server pushes an encrypted payload to both the mobile device application and the vehicle pre-pairing application operating on the automotive computer. The encrypted payload can include a unique vehicle ID, a unique mobile device ID, and one or more of the key pairs. With the pre-pairing information securely pushed to both the mobile device and the vehicle, the user can easily pair the mobile device to the vehicle by simply selecting an approval for the encrypted channel at both sides of the connection, then entering into a classic Bluetooth® connection that is now encrypted without onerous configuration steps.

Embodiments of the present disclosure provide a user-friendly method of establishing an encrypted and secure connection between the user's mobile device and a vehicle computer that do not require additional hardware on the vehicle or the phone, such as Near Field Communication (NFC). The advance pairing system may simplify the connection process, and can work on many mobile devices having the installed application.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

This disclosure considers two approaches for pairing a mobile device to an automotive computer. In a first embodiment, a MAC address is passed to the automotive computer to initiate pairing on a Bluetooth Classic link between the automotive computer and the mobile device. Establishing a Bluetooth Classic link can include sending the mac address to the automotive computer using a Bluetooth® Low Energy (BLE) link after the challenges. In one aspect, the mac address may be sent via an unencrypted link. The automotive computer may then attempt to use the mac address, through the Bluetooth® Classic link, to initiate the pairing process between the mobile device and vehicle. This exchange may result in a user confirmation prompt delivered via an output device in the vehicle, and/or via the mobile device. If the user approves the pairing, an encrypted link established using Bluetooth Classic is established, and the process is complete.

In a second embodiment, the automotive computer and mobile device may create an encrypted channel using the BLE link. On mobile devices that support Cross Transport Key Generation (CTKG), the mobile device and automotive computer may establish the encrypted channel on the BLE link using the CTKG keys. The mobile device and/or the automotive computer may then establish the encrypted BLE link using the for the Bluetooth Classic link. This exchange may result in a user confirmation prompt delivered via the BLE link using an output device in the vehicle, and/or via the mobile device. If the user approves the pairing, an encrypted link established, and the process is complete. In accordance with the second embodiment, there is no need to continue to pass the mac address between the mobile device and automotive computer, because the CTKG performs the service.

Now considering embodiments of the present disclosure in greater detail, FIG. 1 depicts a vehicle user 140 with a new vehicle 105 that remains unpaired with a personal mobile device 120. As shown in FIG. 1, using conventional Bluetooth® encrypted pairing protocols, many users may delay pairing their personal devices with the vehicle due to the complication or number of steps involved in the conventional procedure. As shown in the following examples, an advance pairing and communication system can make the initial pairing for a mobile device and a vehicle seamless and user-friendly such that the user 140 would not have delayed many weeks before attempting the procedure.

Figure 2:
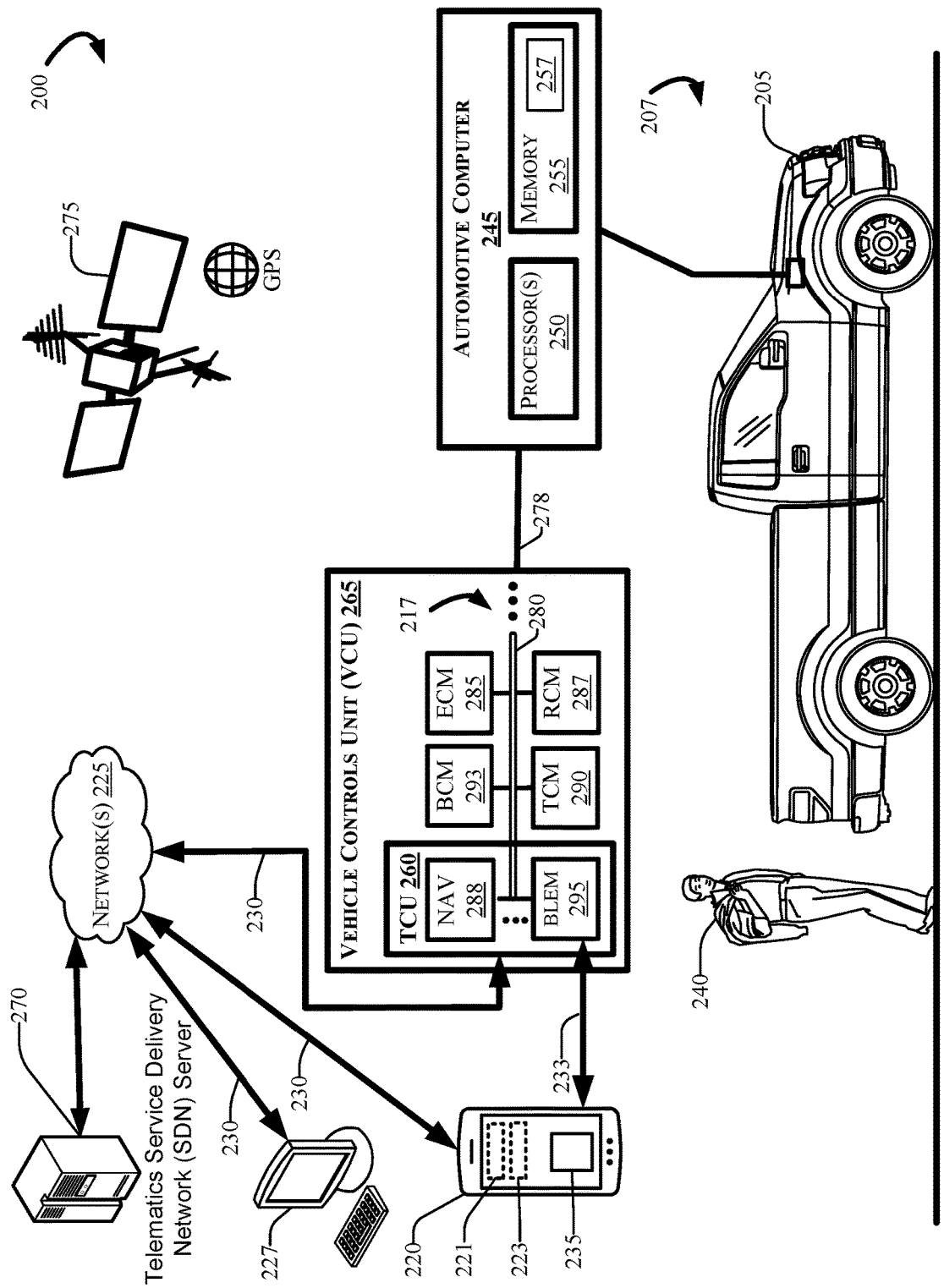
FIG. 2 depicts an example computing environment in which techniques and structures for providing the systems and methods disclosed herein may be implemented according to an embodiment.

FIG. 2 depicts an example computing environment 200 that can include a vehicle 205 comprising an automotive computer 245, and a Vehicle Controls Unit (VCU) 265 that typically includes a plurality of electronic control units (ECUs) 217 disposed in communication with the automotive computer 245 and an advance pairing and communication system 207 for pairing a mobile device 220 with the vehicle 205 in advance of establishing the encrypted communication channel between the device and vehicle. The mobile device 220, which may be associated with a user 240 and the vehicle 205, may connect with the automotive computer 245 using wired and/or wireless communication protocols and transceivers. The mobile device 220 may be communicatively coupled with the vehicle 205 via one or more network(s) 225, which may communicate via one or more wireless channel(s) 230, and/or may connect with the vehicle 205 directly using near field communication (NFC) protocols, Bluetooth® protocols, Wi-Fi, Ultra-Wide Band (UWB), and other possible data connection and sharing techniques. The vehicle 205 may also receive and/or be in communication with a Global Positioning System (GPS) 275. In one aspect, the mobile device 120 may support Cross Transport Key Generation (CTKG), or another key generation technique according to embodiments described in the following sections.

The automotive computer 245 may be or include an electronic vehicle controller, having one or more processor(s) 250 and memory 255. The automotive computer 245 may, in some example embodiments, be disposed in communication with the mobile device 220, and one or more server(s) 270. The server(s) 270 may be part of a cloud-based computing infrastructure, and may be associated with and/or include a Telematics Service Delivery Network (SDN) that provides digital data services to the vehicle 205 and other vehicles (not shown in FIG. 2) that may be part of a vehicle fleet.

Although illustrated as a pickup truck, the vehicle 205 may take the form of another passenger or commercial automobile such as, for example, a car, a sport utility, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 205 may configured as an electric vehicle (EV). More particularly, the vehicle 205 may include a battery EV (BEV) drive system, or be configured as a hybrid EV (HEV) having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 205 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 205 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the advance pairing and communication system 207 may be configured to operate with a vehicle having any level autonomous vehicle control, and/or may be configured to operate in a conventional non-autonomous vehicle.

The mobile device 220 includes a memory 223 for storing program instructions associated with an application 235 that, when executed by a mobile device processor 221, performs aspects of the disclosed embodiments. The application (or "app") 235 may be part of the advance pairing system 207, or may provide information to the mobile device 220 and/or receive information from the advance pairing system 207.

In some aspects, the mobile device 220 may communicate with the vehicle 205 through the one or more channel(s) 230, which may be non-encrypted and/or encrypted, and established between the mobile device 220 and a Telematics Control Unit (TCU) 260. The mobile device 220 may communicate with the TCU 260 using a wireless transmitter (not shown in FIG. 2) associated with the TCU 260 on the vehicle 205. The transmitter may communicate with the mobile device 220 using a wireless communication network such as, for example, the one or more network(s) 225. The wireless channel(s) 230 are depicted in FIG. 1 as communicating information between the one or more network(s) 225 and the mobile device 220, a personal computing device 227, and the vehicle 205.

The vehicle 205 may further communicate with the mobile device 220 via one or more wireless channels 233, which may be direct connection(s) that connect the mobile device 220, among other computing devices and systems, directly with the vehicle 205. The connection(s) 233 may include various low-energy protocols including, for example, Bluetooth®, Bluetooth® Low-Energy (BLE), or other Near Field Communication (NFC) protocols.

The network(s) 225 illustrate an example communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 245 may be installed in an engine compartment of the vehicle 205 (or elsewhere in the vehicle 205) and operate as a functional part of the advance pairing system 207, in accordance with the disclosure. The automotive computer 245 may include one or more processor(s) 250 and a computer-readable memory 255.

The one or more processor(s) 250 may be disposed in communication with one or more memory devices disposed in communication with the respective computing systems (e.g., the memory 255 and/or one or more external databases not shown in FIG. 1). The processor(s) 250 may utilize the memory 255 to store programs in code and/or to store data for performing aspects in accordance with the disclosure. The memory 255 may be a non-transitory computer-readable memory storing an advance pairing system program code. The memory 255 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 265 may share a power bus 280, and may be configured to coordinate the data between vehicle 205 systems, connected servers (e.g., the server(s) 270), and other vehicles (not shown in FIG. 2) operating as part of a vehicle fleet. The VCU 265 can include or communicate with any combination of the ECUs 217, such as, for example, a Body Control Module (BCM) 293, an Engine Control Module (ECM) 285, a Transmission Control Module (TCM) 290, the TCU 260, a Restraint Control Module (RCM) 287, etc. In some aspects, the VCU 265 may control aspects of the vehicle 205, and implement one or more instruction sets received from the application 235 operating on the mobile device 220, from one or more instruction sets received from the advance pairing system 207, and/or from instructions received from an AV controller, such as an AV controller 245 discussed with respect to FIG. 2.

The TCU 260 can be configured to provide vehicle connectivity to wireless computing systems onboard and offboard the vehicle 205, and may include a Navigation (NAV) receiver 288 for receiving and processing a GPS signal from the GPS 275, a Bluetooth® Low-Energy (BLE) Module (BLEM) 295, a Wi-Fi transceiver, an Ultra-Wide Band (UWB) transceiver, and/or other wireless transceivers (not shown in FIG. 2) that may be configurable for wireless communication between the vehicle 205 and other systems, computers, and modules. The TCU 260 may be disposed in communication with the ECUs 217 by way of a bus 280. In some aspects, the TCU 260 may retrieve data and send data as a node in a CAN bus.

The BLEM 295 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 295 may include Generic Attribute Profile (GATT) device connectivity for client devices that respond to or initiate GATT commands and requests, and connect directly with the mobile device 220, and/or one or more keys.

The bus 280 may be configured as a Controller Area Network (CAN) bus organized with a multi-master serial bus standard for connecting two or more of the ECUs 217 as nodes using a message-based protocol that can be configured and/or programmed to allow the ECUs 217 to communicate with each other. The bus 280 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 217 may communicate with a host computer (e.g., the automotive computer 245, the advance pairing system 207, and/or the server(s) 270, etc.), and may also communicate with one another without the necessity of a host computer. The bus 280 may connect the ECUs 217 with the automotive computer 245 such that the automotive computer 245 may retrieve information from, send information to, and otherwise interact with the ECUs 217 to perform steps described according to embodiments of the present disclosure. The bus 280 may connect CAN bus nodes (e.g., the ECUs 217) to each other through a two-wire bus, which may be a twisted pair having a nominal characteristic impedance. The bus 280 may also be accomplished using other communication protocol solutions, such as Media Oriented Systems Transport (MOST) or Ethernet. In other aspects, the bus 280 may be a wireless intra-vehicle CAN bus.

The VCU 265 may control various loads directly via the bus 280 communication or implement such control in conjunction with the BCM 293. The ECUs 217 described with respect to the VCU 265 are provided for exemplary purposes only, and are not intended to be limiting or exclusive. Control and/or communication with other control modules not shown in FIG. 2 is possible, and such control is contemplated.

In an example embodiment, the ECUs 217 may control aspects of vehicle operation and communication using inputs from human drivers, inputs from an autonomous vehicle controller, the advance pairing system 207, and/or via wireless signal inputs received via the wireless channel(s) 233 from other connected devices such as the mobile device 220, among others. The ECUs 217, when configured as nodes in the bus 280, may each include a central processing unit (CPU), a CAN controller, and/or a transceiver (not shown in FIG. 2). For example, although the mobile device 220 is depicted in FIG. 2 as connecting to the vehicle 205 via the BLEM 295, it is possible and contemplated that the wireless connection 233 may also or alternatively be established between the mobile device 220 and one or more of the ECUs 217 via the respective transceiver(s) associated with the module(s).

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 293 may be configured for vehicle energy management, exterior lighting control, wiper functionality, power window and door functionality, heating ventilation and air conditioning systems, and driver integration systems. In other aspects, the BCM 293 may control auxiliary equipment functionality, and/or be responsible for integration of such functionality.

The computing system architecture of the automotive computer 245, VCU 265, and/or the advance pairing system 207 may omit certain computing modules. It should be readily understood that the computing environment depicted in FIG. 2 is one example of a possible implementation according to the present disclosure, and thus, it should not be considered limiting or exclusive.

Figure 3:
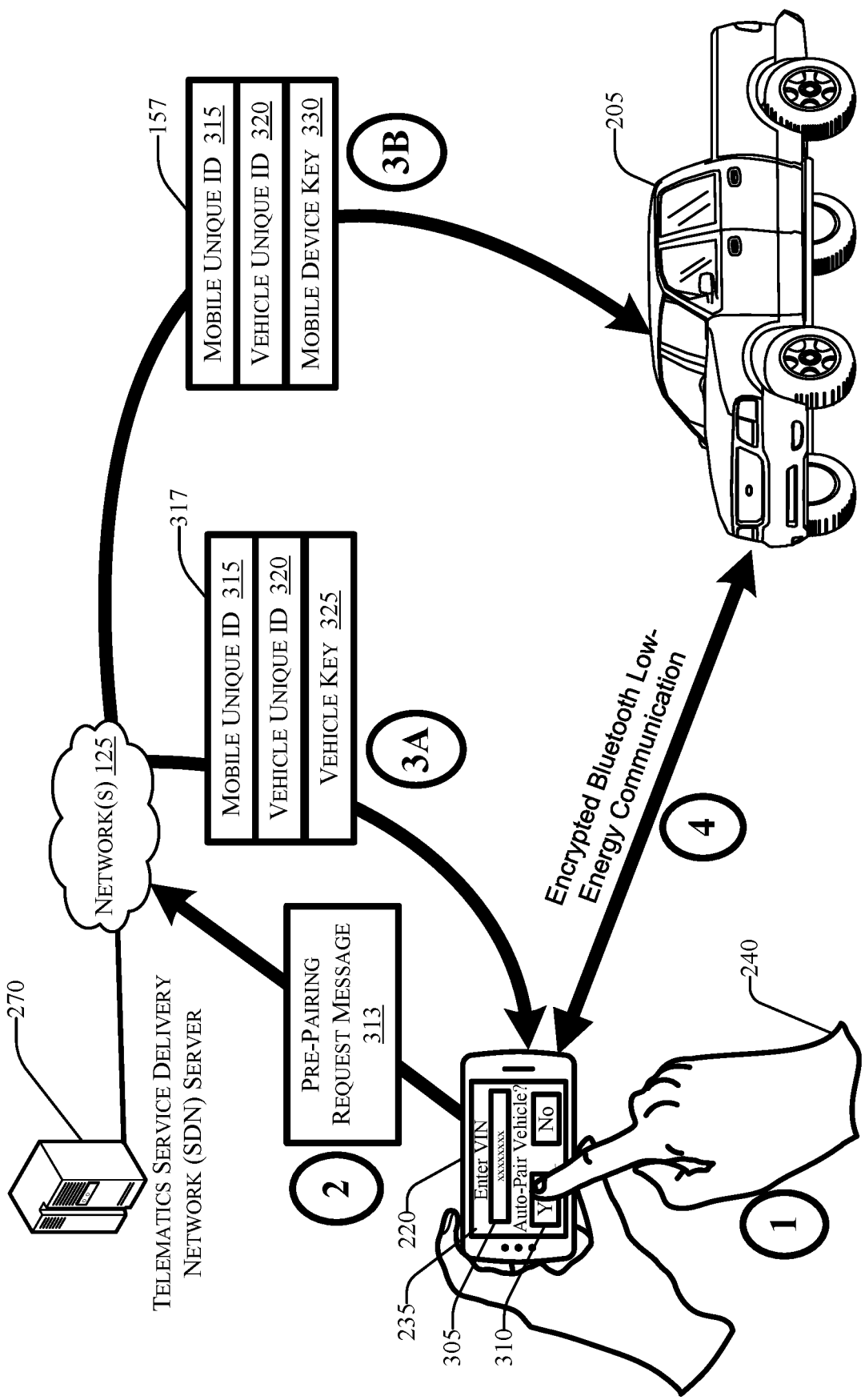
FIG. 3 is a flow diagram depicting an example advance device pairing of a mobile device to an automotive computer using the system of FIG. 1 in accordance with the present disclosure.

FIG. 3 is a flow diagram depicting an example advance device pairing of a mobile device to an automotive computer using the system of FIG. 2 in accordance with the present disclosure. One advantage of the advance pairing and communication system 207 depicted with respect to FIG. 2 is the ability of a user to minimize the number of steps associated with enabling a secured connection between their mobile device 220 and the vehicle 205. In an example scenario, the user 240 may be shopping for a new truck (e.g., the truck 205) and may have made a purchase decision. The user 240 may establish a user account with the original equipment manufacturer (OEM) for the vehicle 205 by installing an application 235 on the mobile device 220, and registering the mobile device 220 (and by extension, the instantiation of the application 235) with the SDN server 270, which may be associated with and/or operated by the OEM of the vehicle 205.

Establishing a user account with the SDN server 270 may include providing user information such as name, residence address, and other personally identifiable information. Establishing the account may further include, as shown in FIG. 3, a pre-pairing operation that configures both the mobile device 220 and the vehicle 205 for a secure communication channel using a Bluetooth® Low Energy (BLE) connection (depicted as step (4) in FIG. 3), or using a Bluetooth® Classic communication channel (not shown in FIG. 3).

At step 1, the user 240 may enter a vehicle identification number (VIN) in an entry box 305, and provide an input that indicates a request to connect the mobile device 220 with the automotive computer 245 (as shown in FIG. 2). Accordingly, the application 235 may provide a plurality of user-selectable icon(s) 310, which may include a selection indicating approval for establishing an automatic pre-pairing of the vehicle 205 with the mobile device 220. At step (1) the user 240 is shown selecting "Yes" to provide the user approval for the auto-pairing operation, which may include consent to remotely push the user's (240) data to the vehicle 205.

At step (2), the mobile device 220 sends a pre-pairing request message 313 to the SDN server 270 responsive to the request to connect the mobile device with the automotive computer. The mobile device 220 may connect with the SDN server 270 via the network(s) 125 using TCP/IP protocols, or another Internet protocol.

Responsive to the pre-pairing request message 313, at Step 3A, the SDN server 270 may send, via the network(s), an encrypted payload 317 to the mobile device 220 that includes a mobile unique identification (ID) 315, a vehicle unique ID 320, and/or a vehicle key 325. The mobile unique ID may uniquely identify the mobile device 220. The vehicle unique ID 320 may uniquely identify the vehicle 205 and the VIN entered in the box 305 of application 235. The vehicle key 325 may be a security key that may be associated with the vehicle's unique ID, and may be part of an encrypted key pair (where the second key is a mobile device key 330).

Figure 4:
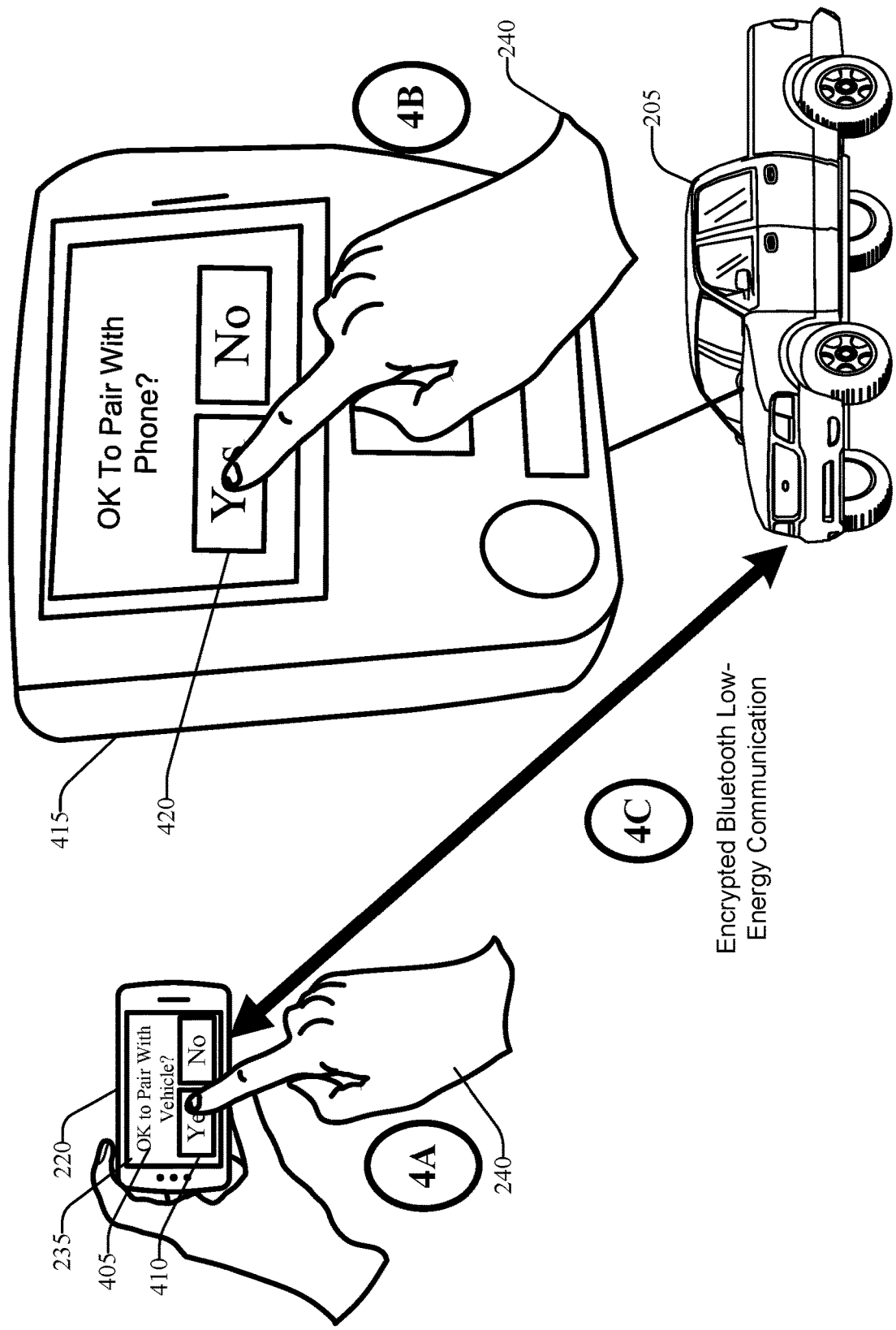
FIG. 4 is a continuation of the flow diagram depicting the user selection steps of the advance device pairing shown in FIG. 3 in accordance with the present disclosure.
Figure 5:
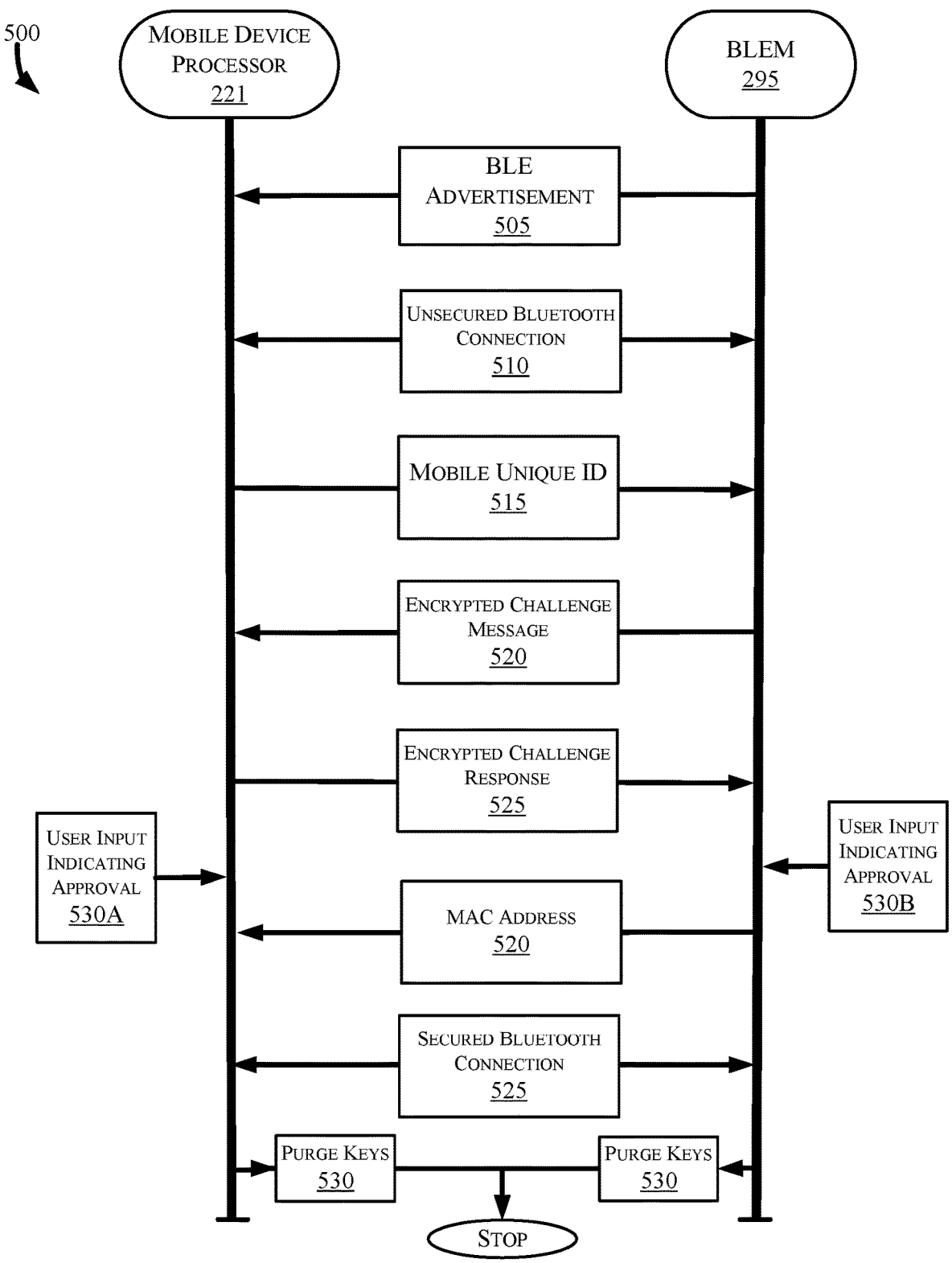
FIG. 5 is a mixed flow diagram depicting pre-approval and device connection steps in accordance with the present disclosure.
Figure 6:
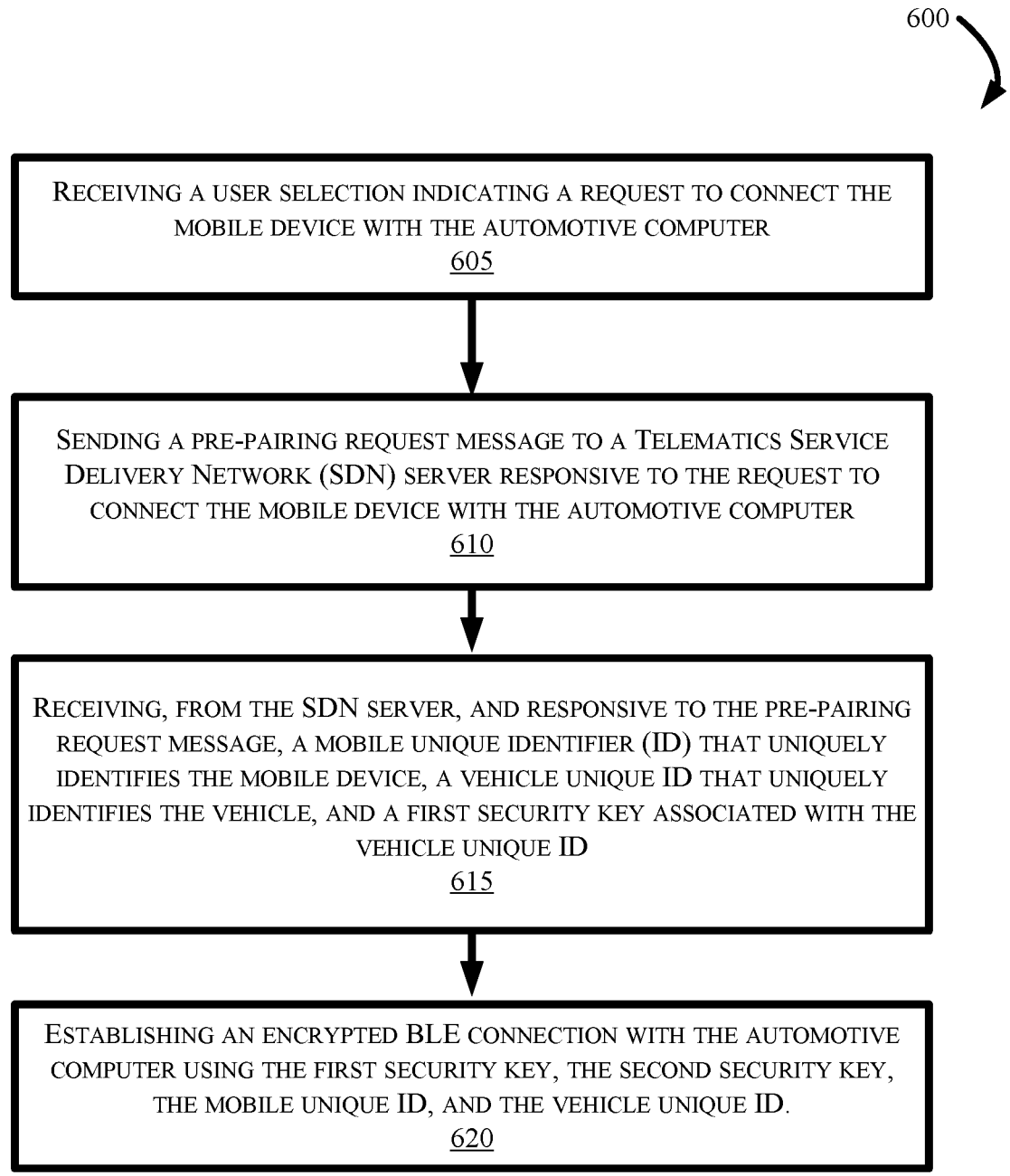
FIG. 6 depicts a flow diagram in accordance with the present disclosure.

At Step 3B, the SDN server 270 may also push an encrypted payload package 257 that can include the mobile unique ID 315, the vehicle unique ID 320, and the mobile device key 330, to the vehicle 205 responsive to the pre-pairing request message 313, where the automotive computer 245 stores the encrypted payload in the memory 255, and uses the encrypted payload in a BLE handshake protocol as depicted in FIGS. 4-6.

At step 4, when the user 240 is ready to connect the mobile device 220 with the vehicle 205, such as, for example, after entering the vehicle 205 and turning the vehicle to a run mode (e.g., powering up the vehicle, keying on, etc.), the vehicle 205 may send a Bluetooth® beacon signal. As explained above, there are two methods contemplated for performing an advanced pairing, including sending a MAC address to initiate paring on a Bluetooth® Classic link, or as shown in the following figure, where paring is initiated on a Bluetooth® Low Energy link. The application 235, after receiving the pre-pairing request message 313, may be configured to listen for the Bluetooth beacon signal responsive to receiving the encrypted payload. In another embodiment, the application 235 may configure the mobile device 220 to listen for the beacon signal responsive to determine, via a GPS signal (not shown in FIG. 3) that the user 240 is proximate to or sitting inside of the cabin of the vehicle 205.

Accordingly, the mobile device 220 may receive the beacon signal transmitted by the vehicle 205, and establish a link using Bluetooth® Classic.

FIG. 4 is a continuation of the flow diagram illustrating the user selection steps of the advance device pairing depicted in FIG. 3 in accordance with the present disclosure. FIG. 4 depicts a pairing scenario where the link is created using a Bluetooth® Low Energy link between the mobile device 220 and the vehicle 205. On mobile devices that support CTKG, if pairing has been achieved on the low energy link then using the keys can be generated for the Bluetooth Classic link. This step may involve a user confirmation prompt/acceptance performed over the Bluetooth LE link. In this method, there is no need to continue to pass the mac address, as the CTKG will complete this functionality.

After establishing the Bluetooth® Classic connection, the vehicle 205 and/or the mobile device 220 may output a request for user input for approval for the encrypted BLE connection. At Step 4A, the user 240 is depicted selecting a user-selectable icon "YES" button 410 indicating the user's approval for the encrypted connection. At Step 4B, the automotive computer 245 may also output a similar message using a user interface 415 in the vehicle cabin. In one aspect, the user interface in the vehicle cabin 415 may be part of an infotainment system onboard the vehicle 205. In another aspect, the user interface may be a separate mobile device or interface that is operatively connected with the BLEM 295. Accordingly, the user 240 may also select a user-selectable icon 420 indicating approval for establishing the encrypted connection between the mobile device 240 and the vehicle 205.

At Step 4C, after receiving the encrypted payload 257, the vehicle 205 is now ready for advance pairing procedures that enable the user 240 to connect the mobile device 220 seamlessly with the automotive computer 245 using the BLEM module 295. The mobile device application 235 may generate an output message 405 requesting user input for pairing the vehicle 205 with the mobile device 220. FIG. 4 at Step 4A shows the user 240 selecting the "YES" icon 410 to indicate their approval of the connection. Responsive to receiving input indicative of user 240 approval for the encrypted BLE connection, the mobile device 220 may establish the encrypted channel at Step 4C using the mobile unique ID 315, the vehicle unique ID 320, and the encryption key pair that includes the vehicle key 325 and the mobile device key 330.

Considering the protocol steps of another embodiment in greater detail, FIG. 5 depicts a mixed flow diagram 500 depicting pre-approval and device connection steps according to an embodiment where paring is completed using a Bluetooth® Classic link. The flow diagram 500 shows two portions of the advance pairing system 207 including the mobile device processor 221 operating as part of the mobile device 220, and the BLEM 295 operating as part of the TCU 260. As explained with respect to FIG. 2, the memory 223 can also include program instructions for the application 235 including, for example, an advance pairing and communication engine (not shown in FIG. 4) having instructions that cause the processor 221 to perform the disclosed steps described below. The TCU 260 may further include a memory and processor disposed in communication with the mobile device processor 221, referred to generally as the automotive computer 245, the processor(s) 250 and the memory 255. The memory 255 may have information stored thereupon, including the encrypted payload 257 as shown in FIG. 2.

In some aspects, the BLEM 295 may execute instructions that control functionality of a low-energy signal transmitting device such as, for example, a Bluetooth® transmitter. In some aspects, the instructions may cause the BLEM 295 to transmit a BLE advertisement 505, which may be configured as an inquiry packet (or more particularly, a set of inquiry packets). In other aspects the input/output (I/O) adapter may function in an unconnected state (e.g., standby mode), and switch into an inquire mode at predetermined intervals to "listen" for broadcasting of low-energy signals associated with other users of the application 235. Receiving device nodes (e.g., the mobile device processor 221) and sending device nodes (e.g., the BLEM 295) may both function as transmitting nodes such that any one of them may broadcast the beacon signal, or function as receiving nodes that receive the BLE advertisement 505 and send response signals to establish secure channels. In the present example of FIG. 5, the mobile device 220 may run the application 235 and function as the receiving node, and the computer system 500 may function as the transmitting node to broadcast the BLE advertisement 505.

In some embodiments, the processor 221 may trigger broadcasting of the BLE advertisement 505 responsive to receiving the encrypted payload 257 from the SDN server 270. The BLE advertisement 505 may include the vehicle unique ID 515. The mobile device 220, after receiving the user input (e.g., via selection of the user-selectable icons 310 that indicate user approval of the pre-pairing operation, as described in FIGS. 3 and 4), may listen for the vehicle unique ID 320 based on the encrypted payload 317 received from the SDN server 270 that included a copy of the same with which the mobile device 220 may compare an advertisement message.

In another embodiment, the processor 250 may trigger broadcasting of the BLE advertisement 505 responsive to an instruction from the SDN server 270. Although referred to as a "Bluetooth® low energy advertisement, it should be appreciated that, in accordance with the present embodiment, the advertisement may include Bluetooth® Classic protocols. For example, the SDN server 270 may receive the pre-pairing request message 313 (as depicted in FIG. 3), send the encrypted payload to the VCU 265, send the encrypted payload 317 to the mobile device 220, and determine a geographic location of the mobile device 220 using the GPS 275. The SDN server may further determine a geographic location of the vehicle 205 based on the NAV controller 288, and determine whether the mobile device 220 is proximate to the vehicle 205. The mobile device 220 may be proximate to the vehicle 205 when the mobile device 220 is within a predetermined operational range that may be, for example, ten meters, five meters, two meters, within an interior of the vehicle 205 cabin, etc. Responsive to determining that the mobile device 220 is proximate to the vehicle 205, the SDN server 270 may generate a control instruction and send the control instruction to the TCU 260 that causes the BLEM 295 to enter into a transmitting mode for broadcasting the BLE advertisement 505.

In yet another embodiment, the processor 250 may trigger broadcasting the BLE responsive to determining that the ignition of the vehicle 205 is switched to an "on" state. For example, when the vehicle 205 is configured as an electric vehicle, the power bus 280 may be energized. In another aspect, when the vehicle is configured as an ICE powertrain, the ignition may be switched to "on" and the vehicle motor may be running. Responsive to determining that the ignition of the vehicle 205 is switched to on (or the like), the automotive computer 245 may determining whether the BLEM 295 is expecting an auto-pair signal from a transmitting mobile device (e.g., the processor 221). The processor(s) may determine this step responsive to triggers such as having received the encrypted payload 257, having received one or more instruction messages from the SDN server 270, etc.

When operating as the transmitting node that initiates the broadcasting of the BLE advertisement 505, the program instructions on the sending device (e.g., the BLEM 295) may cause the processor(s) 250 to transition between states of a protocol sequence for establishing the link layer connection between the computer system 245 and the mobile device processor 221 including, for example, broadcasting the inquiry packet configured as the BLE advertisement 505, and transitioning into a page mode responsive to receiving one or more inquiry responses from the receiving device.

It should be appreciated that, because the automotive computer 245 may be broadcasting the inquiry packet to every device within range that is listening, the receiving node (the mobile device processor 221) may be representative of any and all listening devices, which may be other driver nodes. The paging mode may be used to generate an unsecured connection that can connect two devices. For example, in one example embodiment the instructions may cause the processor(s) 250 to broadcast the inquiry packet as a beacon probe request using the transceiver (e.g., the BLEM 295). The mobile device processor 221 may return an unsecured inquiry response indicative of a device local name of the mobile device processor 221 and/or a Bluetooth transceiver, and a service class universally unique identifier (UUID) for services the device supports. The service class UUID is a value that identifies a type of service/functionality provided by the device mobile device processor 221. The inquiry response may further include transmission power or other information. The transmission power may include, for example, a single byte value containing a transmission power level between −127 dBm and +127 dBm, and/or a Received Signal Strength Indicator (RSSI) to calculate pathloss and give an estimate of which of two or more responding devices is physically closer to the inquiring device (e.g., the BLEM 295).

The processor(s) 250 may transition the BLEM 295 into a connection state through an unsecured Bluetooth Low-Energy (BLE) connection 510 after sending a frequency hopping spectrum (FHS) packet to the mobile device processor 221. In the unsecured connection state, the mobile device processor 221 may transmit a second reply packet that can include the mobile unique ID 515 to the BLEM 295. The BLEM 295 may then transmit back a credentials information packet that may include an encrypted challenge message 520, and may further include information such as a session ID or an incremented counter of sent and received messages.

In some aspects, responsive to receiving the encrypted challenge message 520, the mobile device processor 221 may send an encrypted challenge response 525. The send/receive steps 520 and 525 may respectively trigger the mobile device processor 221 and the BLEM 295 to obtain user input that indicates approval for establishing the encrypted connection. As explained in FIG. 4, the processor 221 may generate the output message 405 requesting approval for the encrypted connection, and responsive to the user-selectable icon "yes" 410 via the user interface in the vehicle cabin 415, the BLEM 295 may transmit a Media Access Control (MAC) address 520 to the mobile device processor 221.

The mobile device processor 221 may register the response information in memory 223, and register one or more MAC addresses associated with the BLEM 295 in the memory 223. The processor 221 may generate a paging reply using the address from the encrypted challenge message 520, and form an encrypted connection using Bluetooth® to establish an encrypted BLE connection with the mobile device processor 221 using the first security key (e.g., the vehicle key 325) associated with the vehicle unique ID 320, the mobile unique ID 315, the second security key (e.g., mobile device key 330) associated with the mobile unique ID, and the vehicle unique identifier. The mobile device processor 221 transmits the Consumer Access Key (CAK), which is used to authenticate device identity, and then a user (e.g., the user 240 as shown in FIG. 2) inputs the link layer establishment PIN to enter a "paired" state. In one example, the link layer information may include a digital CAK, and link layer encryption such as PIN code information stored on the sending node (e.g., the BLEM 295 and/or the automotive computer 245.

The BLEM 295 and the mobile device processor 221 may initiate the secured BLE connection 525 responsive to respectively receiving credential information that matches expected identifying information stored in memory of the respective device(s). Example steps for the connection procedure can include sending initial poll information, sending a reply to the poll, establishing signal encryption based on the vehicle key 325 and the mobile device key 330, and entering into an encrypted connection state. At the end of the bonded session, which may be triggered by powering off the vehicle 205, powering off the mobile device 220, manually ending the connection from either the vehicle 205 interface or the mobile device 220, or another way, the connected devices 220 and 295 may purge the keys 325 and 330.

FIG. 6 is a flow diagram of an example method 600 for advance pairing for a mobile device and an automotive computer, according to the present disclosure. FIG. 6 may be described with continued reference to prior figures, including FIGS. 2-5. The following process is exemplary and not confined to the steps described hereafter. Moreover, alternative embodiments may include more or less steps than are shown or described herein, and may include these steps in a different order than the order described in the following example embodiments.

Referring first to FIG. 6, at step 605, the method 600 may commence with receiving, via a processor, a user selection indicating a request to connect the mobile device with the automotive computer.

At step 610, the method 600 may further include sending, via the processor, a pre-pairing request message to a Telematics Service Delivery Network (SDN) server responsive to the request to connect the mobile device with the automotive computer.

At step 615, the method may include receiving, from the SDN server, and responsive to the pre-pairing request message, a mobile unique identifier (ID) that uniquely identifies the mobile device, a vehicle unique ID that uniquely identifies the vehicle, and a first security key associated with the vehicle unique ID. The vehicle unique ID and the first security key may be associated with a second security key received by and stored on the automotive computer. In some aspects, the second security key may be received by the automotive computer responsive to sending the pre-pairing request message.

At step 620, the method may further include establishing, via the mobile device, an encrypted BLE connection with the automotive computer using the first security key, the second security key, the mobile unique ID, and the vehicle unique ID. Establishing the encrypted BLE connection with the automotive computer may further include receiving, via the mobile device, a first user input indicative of approval for the encrypted BLE connection, and receiving, via the automotive computer, a second user input indicative of approval for the encrypted BLE connection. Establishing an encrypted connection may include two general steps accomplished by the mobile device and the automotive computer. For example, the mobile device may establish a positive identification with the automotive computer, and initiate an unencrypted Bluetooth connection prior to the encrypted connection steps.

Considering first the establishing of the positive identification, the mobile device may open an unencrypted Bluetooth® connection with the automotive computer by sending, to the automotive computer, the mobile unique ID responsive to the BLE advertisement received from the automotive computer. The mobile device may further perform steps that include receiving an encrypted challenge from the automotive computer via the unencrypted Bluetooth® connection, sending a response message comprising an encrypted payload, receiving an encrypted response message from the automotive computer, and finally initiating the encrypted BLE connection responsive to establishing the positive ID. In one aspect, the encrypted payload can include an encrypted challenge response, a session ID message, an incremented message counter, and a MAC address associated with the mobile device.

Establishing the encrypted BLE connection may include performing steps that include, for example, receiving, from the automotive computer, a MAC address associated with the automotive computer, enabling a pairing mode for the processor of the mobile device, outputting, via the processor, a request for a first user input indicative of approval for the encrypted BLE connection, and establishing the encrypted BLE connection between the mobile device and the automotive computer using the first security key and the second security key, responsive to receiving the first user input indicative of approval for the encrypted BLE connection.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for establishing a preliminary encrypted connection for a mobile device and an automotive computer associated with a vehicle, the method comprising:
   receiving a mobile device connection request from a Telematics Service Delivery Network (SDN) server, the mobile device connection request comprising: a mobile unique identifier (ID) that uniquely identifies the mobile device associated with a request to connect the mobile device with the automotive computer, a vehicle unique ID that uniquely identifies the vehicle, and a first security key associated with the vehicle unique ID, wherein the vehicle unique ID and the first security key are associated with a second security key received by and stored on the automotive computer;

broadcasting, via a processor, and responsive to the mobile device connection request, a Bluetooth® Low Energy (BLE) advertisement comprising the vehicle unique ID; and establishing, an encrypted BLE connection with the mobile device using the first security key, the second security key, the mobile unique ID, and the vehicle unique ID.

2. The method according to claim 1, wherein the second security key is received by the automotive computer responsive to sending a pre-pairing request message.

3. The method according to claim 1, wherein establishing the encrypted connection with the automotive computer further comprises:

receiving, via the mobile device, a first user input indicative of approval for the encrypted connection; and receiving, via the automotive computer, a second user input indicative of approval for the encrypted connection.

4. The method according to claim 1, wherein establishing the encrypted connection further comprises:

establishing a positive identification; and initiating an unencrypted connection.

5. The method according to claim 4, wherein establishing the positive identification comprises:

opening the unencrypted connection with the automotive computer by sending, to the automotive computer, the mobile unique ID responsive to an unencrypted Bluetooth® advertisement received from the automotive computer;

receiving, via the mobile device, an encrypted challenge from the automotive computer via the unencrypted connection;

sending a response message comprising an encrypted payload;

receiving an encrypted response message from the automotive computer; and initiating the encrypted connection responsive to establishing the positive identification.

6. The method according to claim 5, wherein establishing the positive identification comprises:

receiving, from the automotive computer, a Bluetooth® Low-Energy (BLE) advertisement;

sending, to the automotive computer, the mobile unique ID, and opening an unencrypted connection with the automotive computer;

receiving, via the mobile device, an encrypted challenge from the automotive computer via the unencrypted connection;

sending a response message comprising an encrypted payload;

receiving an encrypted response message from the automotive computer; and initiating the encrypted connection responsive to establishing the positive identification.

7. The method according to claim 5, wherein the encrypted payload comprises an encrypted challenge response, a session ID message, an incremented message counter, and a Media Access Control (MAC) address associated with the mobile device.

8. The method according to claim 5, wherein initiating the encrypted connection comprises:

receiving, from the automotive computer, a MAC address associated with the automotive computer;

enabling a pairing mode for the processor of the mobile device;

outputting, via the processor, a request for a first user input indicative of approval for the encrypted connection; and establishing the encrypted connection between the mobile device and the automotive computer using the first security key and the second security key, responsive to receiving the first user input indicative of approval for the encrypted connection.

9. The method according to claim 1, wherein establishing the encrypted connection with the automotive computer comprises using an Identity Resolving Key (IRK) to enable vehicle privacy.

10. An automotive computing system associated with a vehicle, the automotive computing system comprising:

a processor; and a memory for storing executable instructions, the processor configured to execute the instructions to:

receive a mobile device connection request from a Telematics Service Delivery Network (SDN) server, the mobile device connection request comprising:

a mobile device unique identifier (ID) that uniquely identifies a mobile device associated with a request to connect the mobile device with the automotive computing system, a vehicle unique identifier that uniquely identifies the vehicle, and a first security key associated with the vehicle unique identifier;

broadcast, via the processor, and responsive to the mobile device connection request, a Bluetooth® Low Energy (BLE) advertisement comprising the vehicle unique identifier; and establish an encrypted BLE connection with the mobile device using the first security key, the mobile device unique ID, a second security key associated with the mobile device unique ID, and the vehicle unique identifier.

11. The system according to claim 10, wherein the processor receives the mobile device connection request from the SDN server responsive to a pre-pairing request message associated with the mobile device.

12. The system according to claim 10, wherein the processor is further configured to execute the instructions to:

receive, via an interface disposed in communication with the processor, a first user input indicative of approval to establish the encrypted BLE connection;

receive, via the mobile device, a second user input indicative of approval for the encrypted BLE connection; and establish the encrypted BLE connection based on the first user input and the second user input.

13. The system according to claim 12, wherein the processor is further configured to execute the instructions to:

receive a mobile device response to the BLE advertisement;

send the vehicle unique identifier responsive to the mobile device response; establish an unencrypted BLE connection with the mobile device based on the mobile device response;

receive, via the mobile device, an encrypted challenge via the unencrypted BLE connection; and establish the encrypted BLE connection responsive to establishing a positive identification.

14. The system according to claim 13, wherein the processor is further configured to execute the instructions to:

send a MAC address associated with the automotive computer; and establish the encrypted BLE connection using the first security key and the second security key, responsive to sending the MAC address associated with the automotive computer.

15. The system according to claim 13, wherein the processor is further configured to execute the instructions to, prior to establishing the encrypted BLE connection:
   send, to the automotive computer, the mobile unique ID responsive to the BLE advertisement; and
   establish the encrypted BLE connection using the mobile unique ID.

16. The system according to claim 10, further comprising:
   sending, via the encrypted BLE connection with the mobile device, a welcome message for output on the mobile device, wherein the welcome message includes information associated with a user account.

17. The system according to claim 16, wherein the user account includes a configuration setting for at least one second device operating within a predetermined radius of the mobile device.

18. A non-transitory computer-readable storage medium having instructions stored thereupon which, when executed by a processor, cause the processor to:
   receive a mobile device connection request from a Telematics Service Delivery Network (SDN) server, the mobile device connection request comprising: a mobile unique identifier (ID) that uniquely identifies the mobile device associated with a request to connect the mobile device with an automotive computer, a vehicle unique ID that uniquely identifies the vehicle, and a first security key associated with the vehicle unique ID, wherein the vehicle unique ID and the first security key are associated with a second security key received by and stored on the automotive computer; and
   broadcast, via the processor, and responsive to the mobile device connection request, a Bluetooth® Low Energy (BLE) advertisement comprising the vehicle unique ID; and
   establish an encrypted BLE connection with the mobile device using the first security key, the second security key, the mobile unique ID, and the vehicle unique ID.

19. The non-transitory computer-readable storage medium according to claim 18, having further instructions stored thereupon to:
   receive, via the mobile device, a first user input indicative of approval for the encrypted BLE connection;
   receive, via the automotive computer, a second user input indicative of approval for the encrypted BLE connection;
   establish a positive identification; and initiate the encrypted BLE connection.

20. The non-transitory computer-readable storage medium according to claim 18, having further instructions stored thereupon to:
   establish an unencrypted BLE connection with the automotive computer by sending, to the automotive computer, the mobile unique ID responsive to a Bluetooth® Low-Energy (BLE) advertisement from the automotive computer;
   receive, via the mobile device, an encrypted challenge from the automotive computer via the unencrypted BLE connection;
   send a response message comprising an encrypted payload;
   receive an encrypted response message from the automotive computer;
   establish a positive identification responsive to receiving the encrypted response message from the automotive computer; and
   initiate a BLE connection responsive to establishing the positive identification.

* * * * *